US009159287B2

(12) United States Patent
Sakashita

(10) Patent No.: US 9,159,287 B2
(45) Date of Patent: Oct. 13, 2015

(54) IMAGE DISPLAY APPARATUS AND IMAGE DISPLAY METHOD

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 635 days.

(21) Appl. No.: 13/548,764

(22) Filed: Jul. 13, 2012

(65) Prior Publication Data

US 2013/0033515 A1 Feb. 7, 2013

(30) Foreign Application Priority Data

Aug. 4, 2011 (JP) ................................. 2011-171319

(51) Int. Cl.

*G09G 3/36* (2006.01)
*G06F 3/038* (2013.01)
*G09G 5/00* (2006.01)
*G09G 5/10* (2006.01)

(52) U.S. Cl.

CPC ...... *G09G 3/3677* (2013.01); *G09G 2320/0261* (2013.01); *G09G 2320/106* (2013.01)

(58) Field of Classification Search

CPC ................ G09G 2320/106; G09G 2320/0261; G09G 3/3648; G09G 2340/16
See application file for complete search history.

(56) References Cited

U.S. PATENT DOCUMENTS 6,803,901 B1 10/2004 Numao
2008/0063048 A1 3/2008 Ouchi et al.
2008/0158212 A1 * 7/2008 Maruyama et al. ........... 345/208
2008/0298695 A1 12/2008 Yoshimura
2009/0059068 A1 * 3/2009 Hanaoka et al. .............. 348/459
2009/0148058 A1 * 6/2009 Dane et al. .................... 382/251
2009/0309890 A1 12/2009 Mizuno et al.
2010/0002005 A1 * 1/2010 Nagaishi et al. .............. 345/522
2011/0081095 A1 4/2011 Sakashita
2011/0170009 A1 7/2011 Uemura et al.
2013/0141478 A1 6/2013 Amino

FOREIGN PATENT DOCUMENTS

JP 2001-183622 A 7/2001
JP 2008-301101 12/2008
JP 2010-231142 10/2010
WO 2011/016541 2/2011
WO 2011/040011 4/2011

OTHER PUBLICATIONS

May 29, 2015 Japanese Office Action in counterpart Japanese Application No. 2011-171319.

* cited by examiner

*Primary Examiner* — Alexander Eisen
*Assistant Examiner* — Nan-Ying Yang
(74) *Attorney, Agent, or Firm* — Fitzpatrick, Cella, Harper & Scinto

(57) ABSTRACT

When the degree of reliability of a motion vector is equal to or higher than a threshold, an interpolated image is generated, and the image of a frame of interest and the interpolated image are output to a panel in the order named. Every time the image is output, a backlight is turned on. When the degree of reliability is lower than the threshold, the image of the frame of interest is output twice to the panel. Every time the image is output, the backlight is controlled to alternately set its light amount to the first light amount and the second light amount smaller than the first light amount.

3 Claims, 3 Drawing Sheets

IMAGE DISPLAY APPARATUS AND IMAGE DISPLAY METHOD

BACKGROUND OF THE INVENTION

1. Field of the Invention

The present invention relates to an image display technique.

2. Description of the Related Art

Recently, liquid crystal display apparatuses have been used as a TV receiver and a PC display apparatus. The liquid crystal display apparatuses can have a flat panel, can save the space and power, and thus are widely used.

When pursuit of a moving object (viewing of tracking a moving object with a line of sight on a moving image display) is performed on a hold type display apparatus typified by a liquid crystal display apparatus, a motion blur corresponding to the light output period in the liquid crystal display apparatus is observed.

As a technique for reducing the motion blur, there is proposed a method of performing an impulse display by flickering the backlight of a liquid crystal display apparatus to perform a black display within one frame period.

In patent literature 1 (Japanese Patent Laid-Open No. 2001-183622), a light emitter is arranged to increase the intensity of light irradiating a pixel in synchronism with scanning of a liquid crystal display panel by increasing the intensity of light irradiating the pixel after scanning, and then decrease the light intensity, or to irradiate the pixel with light and then stop the emission. The method in patent literature 1 can reduce a motion blur.

The method of flickering the backlight in synchronism with scanning of the liquid crystal panel can reduce a motion blur by shortening the lighting period of the backlight and shortening the black display period within one frame period. However, the flicker is visually recognized.

SUMMARY OF THE INVENTION

The present invention has been made to solve the above problems, and provides a technique for reducing image quality degradation caused when generating subframes by dividing one frame into a plurality of frames.

According to the first aspect of the present invention, there is provided an image display apparatus including a display screen with a backlight, comprising: a calculation unit that receives an image of each frame forming a moving image, and obtains a motion vector between frames; a first output unit that, when a degree of reliability of a motion vector obtained by the calculation unit for a frame of interest is not lower than a threshold, generates an image interpolated from images used to obtain the motion vector, outputs an image of the frame of interest to the display screen, and then outputs the generated image to the display screen; a first control unit that turns on the backlight every time the first output unit outputs an image; a second output unit that, when the degree of reliability of the motion vector obtained by the calculation unit for the frame of interest is lower than the threshold, outputs the image of the frame of interest to the display screen, and then further outputs the image of the frame of interest to the display screen; and a second control unit that controls the backlight to alternately set a light amount of the backlight to a first light amount and a second light amount smaller than the first light amount every time the second output unit outputs an image.

According to the second aspect of the present invention, there is provided an image display method to be performed by an image display apparatus including a display screen with a backlight, comprising: a calculation step of receiving an image of each frame forming a moving image, and obtaining a motion vector between frames; a first output step of, when a degree of reliability of a motion vector obtained in the calculation step for a frame of interest is not lower than a threshold, generating an image interpolated from images used to obtain the motion vector, outputting an image of the frame of interest to the display screen, and then outputting the generated image to the display screen; a first control step of turning on the backlight every time an image is output in the first output step; a second output step of, when the degree of reliability of the motion vector obtained in the calculation step for the frame of interest is lower than the threshold, outputting the image of the frame of interest to the display screen, and then further outputting the image of the frame of interest to the display screen; and a second control step of controlling the backlight to alternately set a light amount of the backlight to a first light amount and a second light amount smaller than the first light amount every time an image is output in the second output step.

Further features of the present invention will become apparent from the following description of exemplary embodiments with reference to the attached drawings.

DESCRIPTION OF THE EMBODIMENTS

Embodiments of the present invention will now be described with reference to the accompanying drawings. Note that the following embodiments are merely examples of concretely practicing the present invention, and are detailed examples of arrangements defined in the scope of appended claims.

First Embodiment

Figure 1:
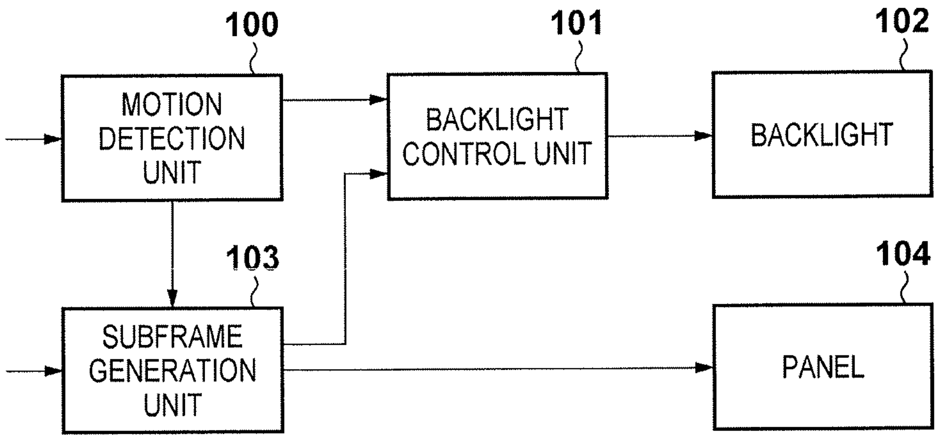
FIG. 1 is a block diagram exemplifying the functional arrangement of an image display apparatus.

The functional arrangement of an image display apparatus according to the first embodiment will be exemplified with reference to the block diagram of FIG. 1. The image of each frame which forms a moving image is input to a motion detection unit 100 and subframe generation unit 103. The moving image may be a received television image or a moving image stored in advance in a memory or the like.

Upon receiving the moving image, the motion detection unit 100 performs inter-frame difference detection, inter-frame motion vector detection, or the like. As the motion vector detection method, there is known a method of dividing a screen into a plurality of regions, obtaining differences between a region of interest and peripheral regions, and determining that the object has moved toward a region where the difference is small. For example, when there are N regions where the difference is smaller than a predetermined threshold, it is determined that the object has moved toward a region where the difference is smallest among the N regions.

As the number of regions where the difference is smaller than a predetermined threshold is smaller, the possibility at which the direction and quantity of a motion vector can be specified becomes higher. In this case, it is determined that the degree of reliability of the motion vector is high. The method of calculating a motion vector and the method of obtaining a degree of reliability of this motion vector are not limited to this example and are arbitrary.

If the degree of reliability of a motion vector obtained (calculated) by the motion detection unit 100 for the frame of interest is equal to or higher than a threshold, the subframe generation unit 103 generates an image (interpolation) interpolated from images used to obtain the motion vector. For example, when the motion detection unit 100 obtains a motion vector in the frame of interest using the image of the frame of interest and the image of a frame immediately preceding the frame of interest, the subframe generation unit 103 generates an interpolated image using these two images. The subframe generation unit 103 outputs the image of the frame of interest to a panel 104 serving as a display screen, and then outputs the interpolated image to the panel 104 (first output). As a matter of course, the image of the frame of interest and the interpolated image may be output in a reverse order. The interpolated image generation method is not limited to this, and an image is arbitrary as long as it is displayed between frames. In general, a technique of generating an image to be displayed between frames is well known. The embodiment can adopt an arbitrary method to generate an image to be displayed between frames.

Every time the first output is executed, a backlight control unit 101 turns on a backlight 102 of the panel 104 (first control). At this time, the lighting period and light amount for a region where a motion vector equal to or larger than a predetermined length has been detected in an image output by the first output are respectively set to be shorter and larger than the lighting period and light amount for another region in the image.

If the degree of reliability of a motion vector obtained by the motion detection unit 100 for the frame of interest is lower than the threshold, the subframe generation unit 103 outputs the image of the frame of interest to the panel 104, and further outputs the image of the frame of interest to the panel 104 (second output).

Every time the second output is executed, the backlight control unit 101 controls the backlight 102 to alternately set the light amount of the backlight 102 to the first light amount and the second light amount smaller than the first light amount (second control), in order to solve a problem that when the same image is displayed repetitively twice, it is displayed as an edge-blurring double image. Note that the first and second light amounts suffice to satisfy the first light amount>the second light amount.

Figure 2:
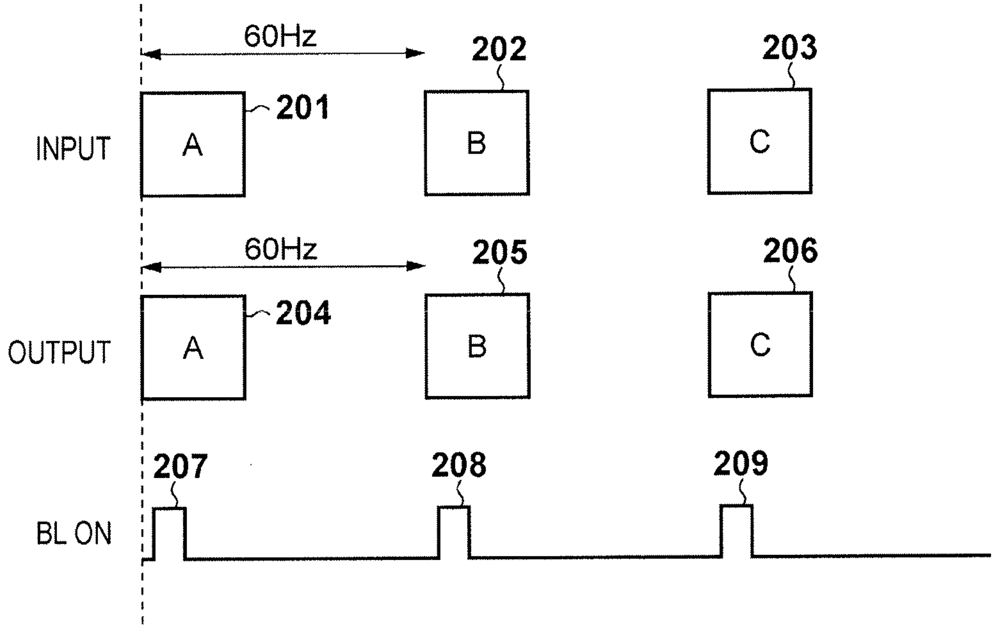
F I G. 2 Prior Art
FIG. 2 is a view for illustrating a conventional problem.

A conventional problem will be explained with reference to FIG. 2. Images 201, 202, and 203 are input at a frame rate of 60 Hz. Images 204, 205, and 206 are obtained by performing various signal processes for the images 201, 202, and 203, and are displayed on the display panel at a frame rate of 60 Hz, respectively. Assume that the images 204, 205, and 206 are displayed in the order named. Pulses 207, 208, and 209 represent that the backlight is turned on (BL ON) when the images 204, 205, and 206 are displayed, respectively. In FIG. 2, a delay arising from the time necessary for signal processes and the like, and the time of scanning on the display panel are not considered.

When the backlight is turned on at the display timings (60 Hz) of the images 204, 205, and 206, the above-described moving image blur is reduced, but a flicker is visually recognized. Especially at a frame rate of 70 Hz or less, a flicker is visually recognized prominently.

Figure 3:
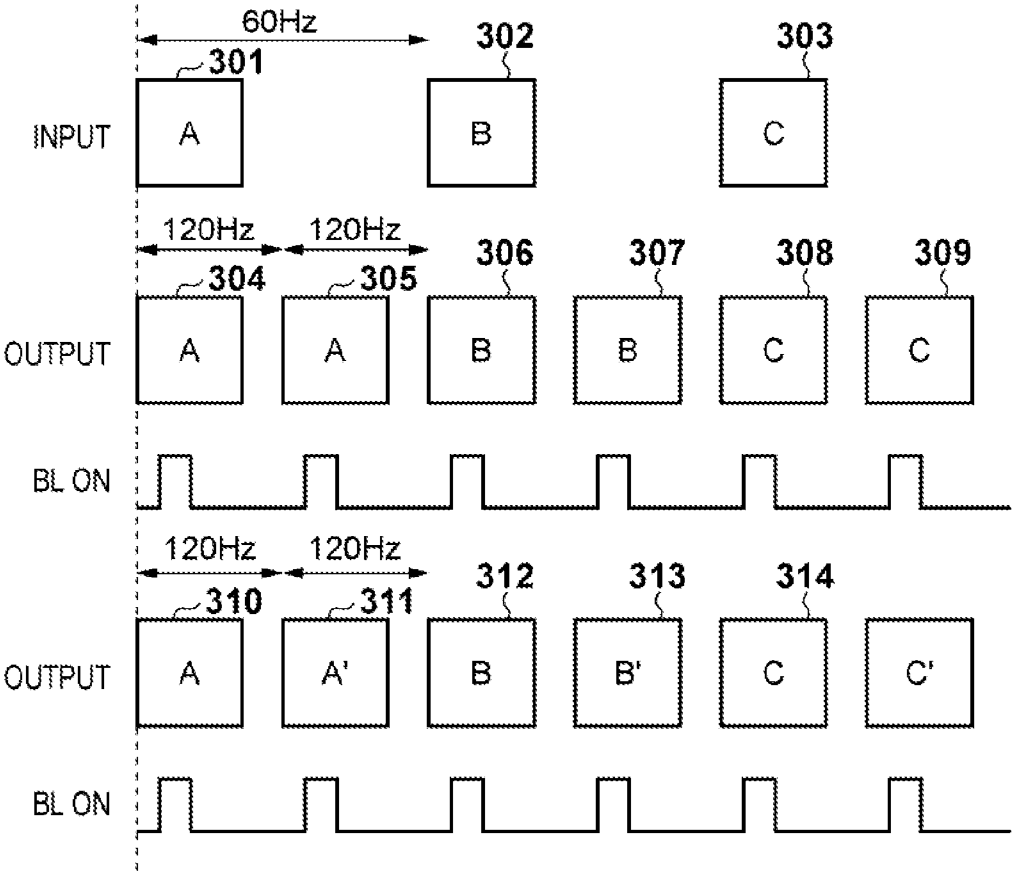
FIG. 3 is a view for illustrating the first embodiment.

Processing to be performed by the image display apparatus according to the embodiment will be described with reference to FIG. 3. Images 301, 302, and 303 are input to the motion detection unit 100 and subframe generation unit 103 at a frame rate of 60 Hz. Assume that the degree of reliability of a motion vector obtained by the motion detection unit 100 for each of the images 301, 302, and 303 is lower than the threshold. In this case, the subframe generation unit 103 outputs images 304 and 305 identical to the image 301, images 306 and 307 identical to the image 302, and images 308 and 309 identical to the image 303 in the order named. As a result, the subframe generation unit 103 outputs images at a frame rate of 120 Hz. Every time each of the images 304 to 309 is output, the backlight control unit 101 controls the backlight 102 to alternately set the light amount of the backlight 102 to the first light amount and the second light amount smaller than the first light amount.

If the degree of reliability of a motion vector obtained by the motion detection unit 100 for each of the images 301, 302, and 303 is equal to or higher than the threshold, an interpolated image is generated. For example, an image 311 is generated by interpolation from an image 310 identical to the image 301 and an image 312 identical to the image 302. Similarly, an image 313 is generated by interpolation from the image 312 identical to the image 302 and an image 314 identical to the image 303. The subframe generation unit 103 outputs the images 310, 311, 312, 313, and 314 to the panel 104 in the order named. Every time each of the images 310, 311, 312, 313, and 314 is output, the backlight control unit 101 turns on the backlight 102 of the panel 104 (BL ON).

According to the first embodiment, a moving image blur is reduced by black insertion by flicking the backlight. The backlight is flickered in synchronism with subframes generated by dividing an input frame into a plurality of frames, implementing a high-quality display in which no flicker is visually recognized. The first embodiment can therefore reduce a moving image blur and flicker.

Second Embodiment

Figure 4:
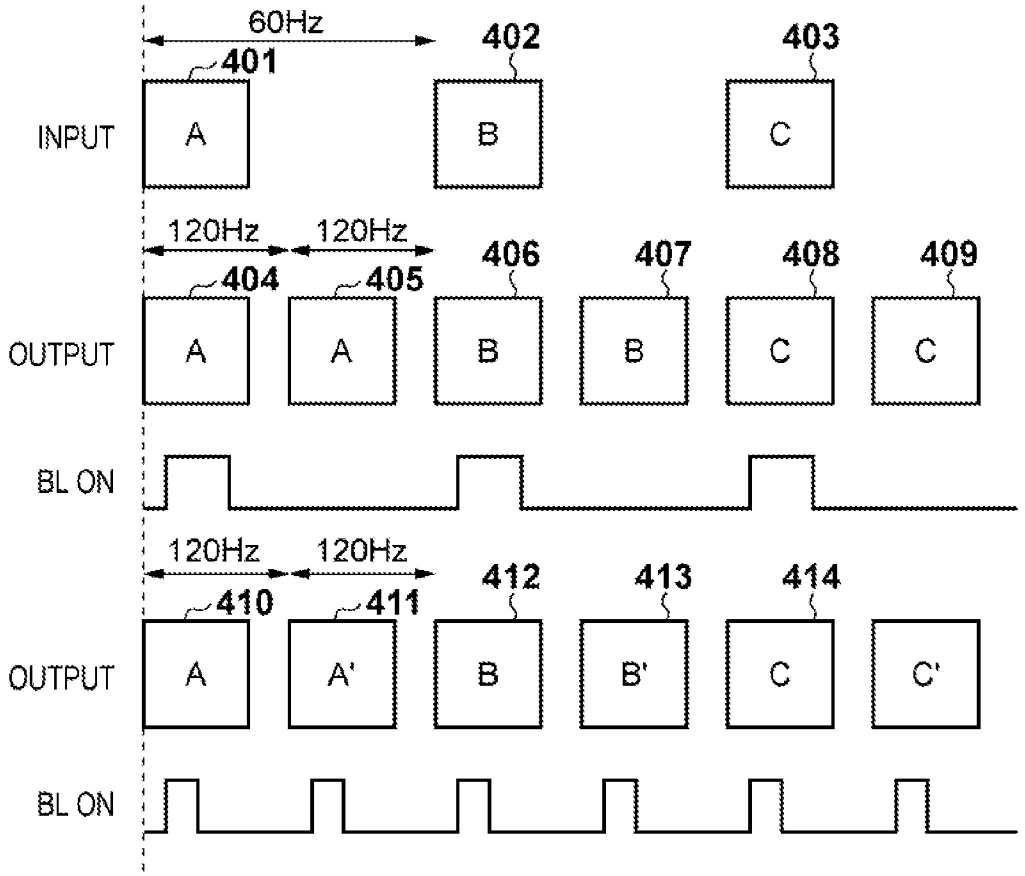
FIG. 4 is a view for illustrating the second embodiment.

The second light amount described in the first embodiment may be a light amount representing an extinction state. In this case, a backlight 102 is controlled as shown in FIG. 4. Images 401 to 414 are identical to the images 301 to 314 in FIG. 3, respectively.

Assume that the degree of reliability of a motion vector obtained by a motion detection unit 100 for each of the images 401, 402, and 403 is lower than a threshold. In this case, a subframe generation unit 103 outputs the images 404 and 405 identical to the image 401, the images 406 and 407 identical to the image 402, and the images 408 and 409 identical to the image 403 in the order named. Every time each of the images 404, 406, and 408 is output, a backlight control unit 101 sets the light amount of the backlight 102 to the first light amount. Every time each of the images 405, 407, and 409 is output, the backlight control unit 101 turns off the backlight 102.

If the degree of reliability of a motion vector obtained by the motion detection unit 100 for each of the images 401, 402, and 403 is equal to or higher than the threshold, the same processing as that in the first embodiment is performed. In FIG. 4, the images 410 to 414 are identical to the images 310 to 314 in FIG. 3, respectively.

Third Embodiment

Although each unit shown in FIG. 1 may be formed from hardware, it is also possible to form a motion detection unit 100 and subframe generation unit 103 from software (computer programs) and store the software in a memory. In this case, the control unit (for example, CPU) of the image display apparatus executes the software, implementing the functions of the motion detection unit 100 and subframe generation unit 103.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-171319 filed Aug. 4, 2011 which is hereby incorporated by reference herein in its entirety.

What is claimed is:

1. An image display apparatus including a display screen with a backlight, comprising:

an input unit configured to input each frame forming a moving image;

an obtaining unit configured to obtain a motion vector between frames inputted by said input unit;

a first determination unit configured to determine whether the reliability of the motion vector obtained by said obtaining unit between a first frame and a second frame is larger than a threshold;

a second determination unit configured i) to determine, as an intermediate frame to be displayed between the first and second frames, an interpolation frame being generated based on the motion vector and images of the first and second frames in a case where the reliability is larger than the threshold, and ii) to determine, as the intermediate frame, an image frame being based on not an image of the second frame but on an image of the first frame in a case where the reliability is not larger than the threshold; and a control unit configured i) to control the backlight to emit light at a brightness being based on an image of the interpolation frame so as to display the interpolation frame as the intermediate frame in a case where the reliability is larger than the threshold, and ii) to control the backlight to emit light at a darker brightness than the brightness upon displaying the first frame so as to display the image frame as the intermediate frame in a case where the reliability is not larger than the threshold.

2. The apparatus according to claim 1, wherein said control unit controls a lighting period for a region where a motion vector not shorter than a predetermined length has been detected in the interpolation frame, to be shorter than a lighting period for a region other than the region in the interpolation frame, and controls the brightness for the region where a motion vector not shorter than the predetermined length has been detected in the interpolation frame, to be brighter than brightness for the region other than the region in the interpolation frame.

3. An image display method to be performed by an image display apparatus including a display screen with a backlight, comprising:

an inputting step of inputting each frame forming a moving image;

an obtaining step of obtaining a motion vector between frames inputted by said inputting step;

a first determination step of determining whether the reliability of the motion vector obtained by said obtaining step between a first frame and a second frame is larger than a threshold;

a second determination step of i) determining, as an intermediate frame to be displayed between the first and second frames, an interpolation frame being generated based on the motion vector and images of the first and second frames in a case where the reliability is larger than the threshold, and ii) determining, as the intermediate frame, an image frame being based on not an image of the second frame but on an image of the first frame in a case where the reliability is not larger than the threshold; and a controlling step of i) controlling the backlight to emit light at a brightness being based on an image of the interpolation frame so as to display the interpolation frame as the intermediate frame in a case where the reliability is larger than the threshold, and of ii) controlling the backlight to emit light at a darker brightness than the brightness upon displaying the first frame so as to display the image frame as the intermediate frame in a case where the reliability is not larger than the threshold.

* * * * *